(12) United States Patent
Pfister

(10) Patent No.: US 6,370,452 B1
(45) Date of Patent: Apr. 9, 2002

(54) AUTONOMOUS VEHICLE TRANSIT SYSTEM

(76) Inventor: Samuel T. Pfister, 2006 Fairburn Ave., Los Angeles, CA (US) 90025

( * ) Notice: Subject to any disclaimer, the term of this patent is extended or adjusted under 35 U.S.C. 154(b) by 0 days.

(21) Appl. No.: 09/456,812

(22) Filed: Dec. 8, 1999

(51) Int. Cl.$^7$ .................................................. G06F 7/00
(52) U.S. Cl. ............................ 701/23; 701/24; 701/25
(58) Field of Search .......................... 701/23, 207, 210, 701/24, 25, 19; 318/587, 580; 340/901, 902, 991, 993, 870.03, 870.07; 180/167, 168

(56) References Cited

U.S. PATENT DOCUMENTS

| | | | |
|---|---|---|---|
| 4,821,192 A | 4/1989 | Taivalkoski et al. ... 364/424.02 |
| 4,829,442 A | 5/1989 | Kadonoff et al. ........... 364/449 |
| 5,053,964 A | * 10/1991 | Mister et al. ................. 701/19 |
| 5,165,064 A | 11/1992 | Mattaboni .................... 356/152 |
| 5,280,431 A | 1/1994 | Summerville et al. . 364/424.02 |
| 5,355,511 A | * 10/1994 | Hatano et al. .............. 455/11.1 |
| 5,420,794 A | 5/1995 | James ......................... 364/436 |
| 5,420,883 A | * 5/1995 | Swensen et al. ............ 375/138 |
| 5,432,841 A | * 7/1995 | Rimer ......................... 455/457 |
| 5,467,273 A | 11/1995 | Faibish et al. ......... 364/424.02 |
| 5,525,883 A | 6/1996 | Avitzour ...................... 318/587 |
| 5,603,091 A | * 2/1997 | Linquist et al. ............ 455/56.1 |
| 5,640,151 A | * 6/1997 | Reis et al. ............. 340/825.54 |
| 5,742,509 A | * 4/1998 | Goldberg et al. ........... 701/211 |
| 5,760,742 A | * 6/1998 | Branch et al. .............. 342/457 |
| 5,815,825 A | 9/1998 | Tachibana et al. ............ 701/23 |
| 5,825,298 A | 10/1998 | Walter .................... 340/825.54 |
| 5,856,976 A | * 1/1999 | Hirano ........................ 370/401 |
| 5,867,089 A | * 2/1999 | Zyburt et al. ........... 340/323 R |
| 5,867,800 A | 2/1999 | Leif ............................. 701/23 |
| 5,906,647 A | 5/1999 | Zyburt et al. .................. 701/24 |
| 5,911,767 A | 6/1999 | Garibotto et al. ............. 701/28 |
| 5,928,294 A | * 7/1999 | Zelinkovsky ................. 701/24 |
| 6,032,097 A | * 2/2000 | Iiboshi et al. ................. 701/96 |
| 6,052,632 A | * 4/2000 | Iiboshi et al. ................. 701/36 |
| 6,061,613 A | * 5/2000 | Zyburt et al. ................. 701/24 |
| 6,097,313 A | * 8/2000 | Takahashi et al. .......... 340/905 |
| 6,141,620 A | * 10/2000 | Zyburt et al. ............... 701/117 |

OTHER PUBLICATIONS

Wagner, I.A., et al., "Efficiently Exploring a Continuous Unknown Domain by an Ant–Inspired Process", IBM Haifa Research Lab Extended Abstract, Jun. 5, 1998, pp. 1–8.

Wagner, I.A., et al., "Cooperative Cleaners: a Study in Ant–Robotics", IBM Haifa Research Lab, Department of Computer Science, Technical Report CIS 9512, *Center for Intelligent Systems*, Jun. 1995, pp. 1–21.

* cited by examiner

*Primary Examiner*—Jacques H. Louis-Jacques
(74) *Attorney, Agent, or Firm*—Christie, Parker & Hale, LLP

(57) ABSTRACT

A transit system in an environment is provided that includes vehicles and communication nodes. The communication nodes contain information that is updated or re-written and sent to one or more vehicles. The information stored in the communication nodes provides data regarding the environment, communication node positions, vehicle communique, and vehicle control. The vehicles and the communication nodes communicate with each other. A vehicle by receiving the information from the communication nodes is able to move in the environment without complex sensors, to adapt to changes in the environment, to perform specific actions, and to communicate to other vehicles. Also, a vehicle by updating the information in the communication nodes is able to update out-dated information and to affect the actions and movements of other vehicles.

26 Claims, 10 Drawing Sheets

AUTONOMOUS VEHICLE TRANSIT SYSTEM

BACKGROUND OF THE INVENTION

The present invention relates to autonomous vehicles and communication nodes, and more particularly, to methods and systems of operating autonomous vehicles or robots in a transit system containing readable and re-writeable communication nodes.

Autonomous vehicles, i.e., vehicles reacting and responding independently in an environment, are widely pervasive. Conventional autonomous vehicles often contain a complex array of sensors and control systems to navigate and operate in a known or unknown environment. When the conventional autonomous vehicle is introduced into an environment, the conventional autonomous vehicle uses its complex array of sensors to gather information regarding the environment, such as the distance to a wall or the slope of a hill. The conventional autonomous vehicle then uses its control systems to navigate the environment based on the information gathered from its array of sensors.

In order to navigate an environment, conventional autonomous vehicles typically maintain a record of the vehicle's own position within the environment. Odometer sensors are widely used for this purpose by measuring the motion of the autonomous vehicle's actuation systems to estimate relative distances traveled from a specific position. However, imperfect mechanical motion over terrain in the environment introduces small errors in the measurements made by the odometer sensors. These small errors continuously compound as the autonomous vehicle moves and thus over time a substantial error occurs. Even with expensive and complex sensor systems, it often becomes difficult for a conventional autonomous vehicle within a moderately complex and irregular environment to determine its position within the environment. One example is described in Garibotto et al. (U.S. Pat. No. 5,911,767) in which Garibotto et al. describes a navigation system for an autonomous mobile robot.

To facilitate and enhance an autonomous vehicle's ability to navigate an environment, especially a moderately complex and irregular environment, communication nodes such as beacons are generally utilized. Conventionally, beacons are placed in predetermined positions in the environment that are known to the autonomous vehicle. Beacons may be passive or active and often contain unique coded information that enables the autonomous vehicle to distinguish one beacon from another. The unique coded information is associated with a position in the environment that is known by the autonomous vehicle. Hence, when a beacon is detected, the autonomous vehicle uses a lookup table to correspond the coded information with a position in the environment. The detection and analysis of a single or multiple beacons allows the vehicle to determine its own position in a global reference frame or map of the environment.

However, the described beacon based navigation system requires that each autonomous vehicle have access to a pre-established map of the environment with the positions of the beacons recorded in the map. For example, Taivalkoski et al. (U.S. Pat. No. 4,821,192) describes a node map system for a vehicle and Kadonoff et al. (U.S. Pat. No. 4,829,442) describes a beacon navigation system for guiding a vehicle. The pre-established map is either stored in an on-board memory of each vehicle or transmitted to each vehicle from a central system using a wireless communication link. Both of these local and remote storage options, however, add complexity and cost to the autonomous vehicle. For instance, a change in the environment requires a change to the map, usually a manual change, which greatly limits the autonomy and extensibility of the vehicle navigating in a changing environment.

To further facilitate and enhance an autonomous vehicle's ability to navigate an environment, communication and cooperation between multiple autonomous vehicles is sometimes utilized. The communication and cooperation between multiple autonomous vehicles are commonly achieved using a wireless communication link between each of the vehicles and a central control system. Each vehicle must be capable of generating a communication signal powerful enough to reach a central control system. Thus, each vehicle has an on-board communication system that consumes substantial amounts of power which increases at longer ranges between the vehicles and the central control system. Furthermore, the central control system becomes increasingly complex and costly as the number of vehicles increases.

Thus, both conventional autonomous vehicles and conventional communication nodes used in combination are often complex and expensive in construction and operation. Also, the combination of a conventional autonomous vehicle and communication node are limited in the extensibility of their operation. Accordingly, methods and systems which overcome the obstacles of providing a cost-effective, decentralized and low power communication node and autonomous vehicle combination that include the advantages in extension of capabilities and effectiveness of operation of the combination with no range limitations are desirable.

SUMMARY OF THE INVENTION

The present invention provides methods and systems of a transit system containing autonomous vehicles and readable and re-writeable communication nodes that share information with each other. The methods and systems of the transit system provide a cost-effective, de-centralized and low power combination of vehicles and communication nodes which additionally provides extended capabilities and flexibility of operation of the transit system.

A transit system includes a plurality of communication nodes. Each of the plurality of communication nodes includes a node memory able to store information, a node communication device configured to receive information, and a node controller coupled to the node memory and the node communication device. The transit system also preferably includes a plurality of vehicles. Each of the plurality of vehicles includes a vehicle communication device able to transmit information, and a vehicle controller coupled to the vehicle communication device. The vehicle controller is configured to cause the vehicle communication device to transmit information to one of the plurality of communication nodes.

A feature of the present invention is that the node controller of the one of the plurality of communication nodes is configured to update portions of the node memory with information from a first one of the plurality of vehicles. An advantage of this feature is that vehicles are able to share information with each other without being in close proximity of each other. Also, information about the environment, other vehicles, control data, position, or other similar types of information can be distributed throughout the plurality of communication nodes. Therefore, the node memory of each of the communication nodes can be comparatively small to store information about portions of the environment, communication nodes and vehicles, instead of information about the entire environment, communication nodes, and vehicles. Furthermore, the information stored in the node memory can be continually and dynamically updated or refreshed by each passing vehicle operating in the transit system. Therefore, a large high-power transmitter and central control station to update each communication node or manually changing information on each communication node is not needed.

Additionally, in one embodiment, the information includes messages for a second one of the plurality of vehicles from a first one of the plurality of vehicles. An advantage of this feature is that vehicles are able to communicate to with one another without being in close proximity of each other. Likewise, since communication between vehicles is accomplished through the communication nodes, vehicles are able to use low power communication devices with a limited communication range.

In one embodiment, the vehicle controller of each of the plurality of vehicles is also configured to manipulate each of the plurality of vehicles according to the information transmitted. An advantage of this feature is that each vehicle is capable of being provided vehicle control data by a communication node. This allows the vehicle the ability to operate without an on-board computer program or a limited computer program and thereby saving cost and power.

In another embodiment, the vehicle controller of one of the plurality of vehicles is also configured to determine positional information of a first one of the plurality of communication nodes based on the absolute position of the one of the plurality of vehicles. The positional information of the first one of the plurality of communication nodes is transmitted to a second one of the plurality of communication nodes by the vehicle communication device of one of the plurality of vehicles.

A feature of the present invention is that the node controller of the second one of the plurality of communication nodes updates its node memory with the transmitted positional information. An advantage of this feature is that the paths or links logically mapped out by an array of communication nodes is changeable without updating a central map and propagating the central map to all the vehicles. Furthermore, this feature illustrates the advantage that a central map is not needed.

In yet another embodiment, the node memory of one of the plurality of communication nodes stores information that includes environmental data and the node communication device of the one of the plurality of communication nodes transmits the environmental data. This feature of the present invention provides the advantage that information about the environment is capable of being stored and conveyed to one or more vehicles operating in the transit system.

Many of the attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

I. Overview

Figure 1:
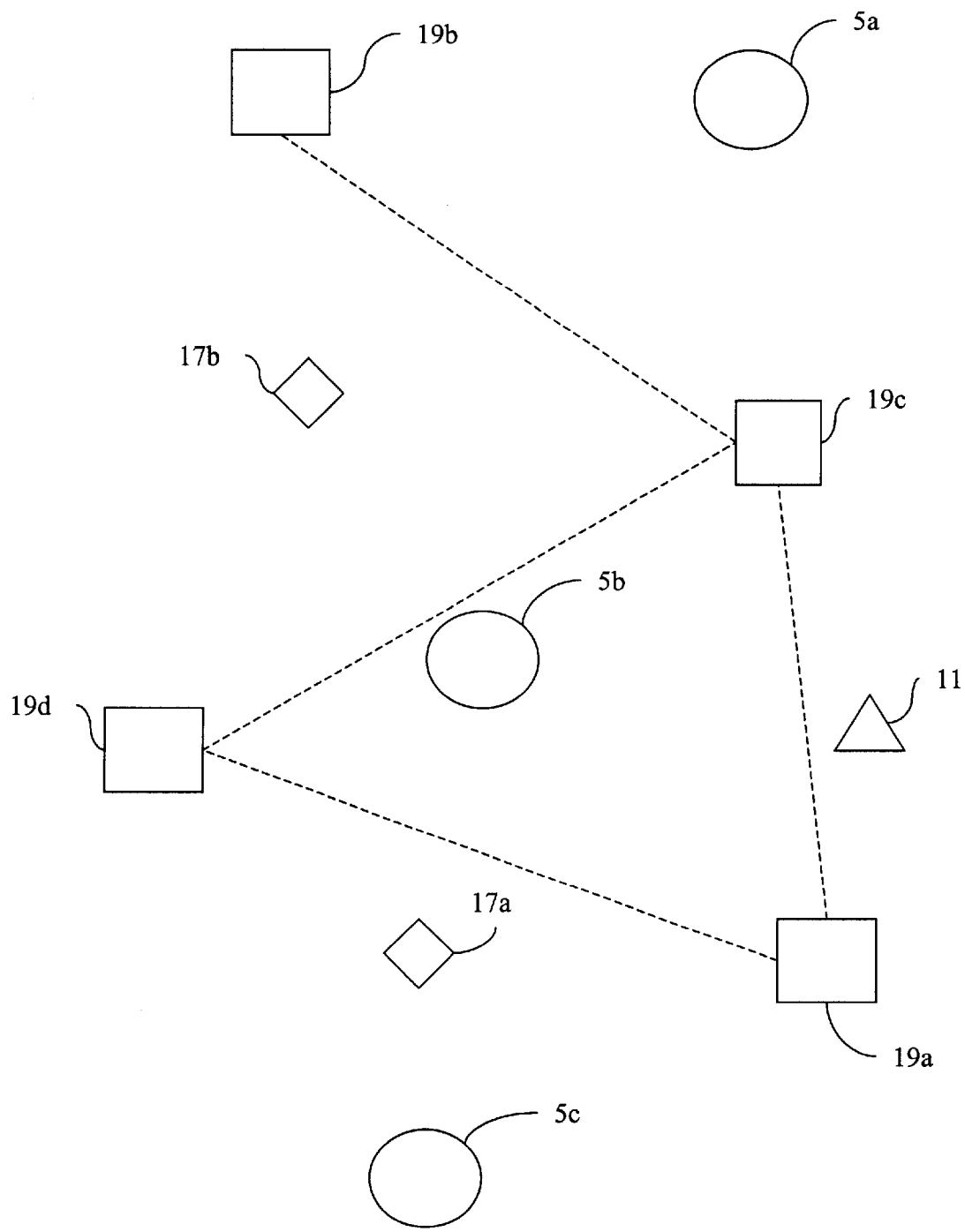
FIG. 1 illustrates an overview of a transit system of the present invention.

FIG. 1 illustrates a block diagram of an abstract model of one embodiment of a transit system of the present invention. The abstract model includes a plurality of vehicles $5a$–$5c$ and communication nodes $19a$–$19d$. For illustrative purposes, the number of vehicles and communication nodes are limited, as it should be recognized that the number of vehicles and communication nodes may be exceedingly numerous. Communication nodes $19a$–$19d$ are placed throughout an environment. The communication nodes are placed in the environment at predetermined locations manually or by a mapping vehicle. The mapping vehicle is an autonomous vehicle or a vehicle operated by an operator that uses a map or global reference frame that is loaded onboard the mapping vehicle. Utilizing the map, the mapping vehicle places the communication nodes in the environment at predetermined locations.

In the embodiment described, the vehicles $5a$–$5c$ are able to communicate with the communication nodes $19a$–$19d$. By communicating with the communication nodes in the environment, the vehicles are able to traverse the environment autonomously or without operator assistance and without a map. For example, vehicle $5c$ broadcasts an initiate signal which is received and acknowledged by the communication node $19a$. The communication node $19a$ transmits information to the vehicle $5c$. In one embodiment, the communication node $19a$ is initially stored with information.

The information that is provided to the vehicle, in one embodiment, contains data concerning the location of another communication node. For example, the information from communication node $19a$ contains distance and angle measurements to the communication node $19d$ from the communication node $19a$. By using the information received from the communication node $19a$, the vehicle $5c$ is able to travel to the communication node $19d$. Preferably, each of the communication nodes, e.g., communication nodes $19a$–$19d$, within the environment contains data concerning the location of one or more neighboring communication nodes. Therefore, the vehicle 5c, for example, is able to traverse the environment by moving from communication node to communication node such as from communication node 19a to node 19d to node 19c and finally to node 19b. Similarly, as another example, vehicle 5a is able to traverse the environment by moving from communication nodes 19b to node 19c to node 19d and finally to node 19a.

The closer the distance between communication nodes in the environment, the tighter the control is provided over the vehicle traversing the environment. In other words, if the distance between communication nodes is too large, the vehicle may be unable to effectively traverse the environment. For example, the positional and heading error propagation that is introduced by motion, i.e., the vehicle traversing the environment, can be large. As a result, the vehicle may not be able to locate a communication node to correct or remove the positional or heading error experienced by the vehicle traversing the environment. In one embodiment, the distance between communication nodes is about seven feet. For different environments, the placement of the communication nodes would also be correspondingly different.

Furthermore, in one embodiment, the communication node 19a is able to transmit environment information to the vehicle 5c. The environment information, in one embodiment, includes relative distance and heading to nearby objects, obstacles and/or boundaries and local terrain type. Utilizing the environment information, the vehicle is able to traverse the environment more efficiently by avoiding obstacles or terrain for which the vehicle is not equipped to handle, e.g., water. Therefore, a vehicle with none or minimal and/or simplistic sensors by communicating with the communication nodes is able to maneuver in the environment without incident.

In one embodiment, the vehicles 5a–5c, traversing the environment, transmits information to a communication node. For example, vehicle 5b transmits information to the communication node 19d. The communication node 19d stores the information provided by vehicle 5b. In one embodiment, the information provided by the vehicle updates previous information stored in the communication node. For instance, the vehicle transmits environment or location information to the communication node to update the current environment information or node location information stored within the communication node.

For example, if an object 11 is detected or otherwise made known to the vehicle 5b that was previously unknown to both vehicle 5b and the communication node 19a, the vehicle 5b transmits the location of the object 11 to the communication node 19a. The communication node 19a then updates the environment information stored in the communication node with the location or positional data of the object 11. Accordingly, if another vehicle, such as vehicle 5c, communicates with the communication node 19a, the communication node 19a is able to provide the updated environment information about the location of object 11 to vehicle 5c. Using the updated environment information, the vehicle is able to avoid or move to the object. Hence, as the environment changes, the updated environment information is capable of being communicated to the communication nodes and the vehicles. Therefore, the description of the environment is easily changed without any modification to a central map or database. Accordingly, a tremendous amount of flexibility and ability to adapt to a dynamic environment is provided.

In one embodiment, information stored by the communication node 19d that was transmitted from a vehicle includes vehicle communiques, i.e., communication from one vehicle intended for one or more other vehicles or the vehicle itself. The vehicle communiques, in one embodiment, include information about a passing vehicle such as a unique identification number, a time in which the vehicle passed, destination or origination of the vehicle, mission, and/or cargo of the vehicle. Using the vehicle communique, another vehicle communicating with the communication node 19d is able to be affected by the information.

For example, if each of the vehicles 5a–5c must traverse or cover the environment that has not been traversed by another vehicle, the vehicle communique is able to provide the information that vehicle 5b has traveled to the communication node 19c. Accordingly, the vehicles 5a and 5c are able to traverse to other communication nodes, e.g., communication nodes 19b and 19a, respectively, and not redundantly move towards the communication node 19d. For instance, vehicle 5a moves towards communication node 19c and communicates with the node 19c. Based on the vehicle communique that vehicle 5b has traveled to the communication node 19c, the vehicle 5a stops or alternatively changes direction and moves to communication node 19d. Therefore, the vehicle is able to maneuver the environment effectively and efficiently as prescribed by the operation of the vehicle but without any assistance from a central processing station or a complex sensor array.

In one embodiment, the vehicle communique is represented by a counter stored in the communication nodes. For example, as the vehicle 5b passes the communication node 19c, the counter is incremented. Hence, if another vehicle, e.g., vehicle 5c, encounters the communication node 19c and reads that the counter is not zero, the vehicle 5c determines that another vehicle has visited the communication node 19c. Thus, the vehicle 5c does not need to visit it again. In another embodiment, the counter stored in the communication nodes tracks the number of times a specific vehicle has passed or the total number of vehicles that have passed the communication node.

Furthermore, the information stored on the communication nodes, in one embodiment, includes vehicle control data. In one embodiment, the vehicle control data includes commands to cause a vehicle to perform specific actions. For example, communication node 19c has vehicle control data and transmits the data to vehicle 5b. The vehicle 5b is then commanded to perform a specific action, such as pick up an object, based on the vehicle control data received. The vehicle control data is stored in the communication nodes and the information is updated by one or more passing vehicles that communicate with the communication nodes. The different types of vehicle control data include commands to move to a specific neighboring node, halt, pick up or drop an object, and/or move to a node and then update the information on that node. Also, the vehicle control data includes a range of control options for vehicles traversing the environment among the communication nodes. For example, on one end of the range of control options, complete control can be provided to the vehicles as a distributed and dynamic computer program written into the environment by the array of communication nodes. On the other end of the range of control options, complete control can be provided to each individual vehicles' onboard systems utilizing information provided by the communication nodes in the environment.

In one embodiment, the communication nodes and the vehicles communicate to each other through the transmission of chemicals. For example, the communication node releases a chemical that is recognized only by a specific vehicle or vice versa. Alternatively or additionally, the communication is performed by using biological agents. In one embodiment, the communication nodes and the vehicles communicate to each other in an electro-mechanical manner such as using radio signals or magnetic or electrical conductivity.

II. Vehicle

Figure 2:
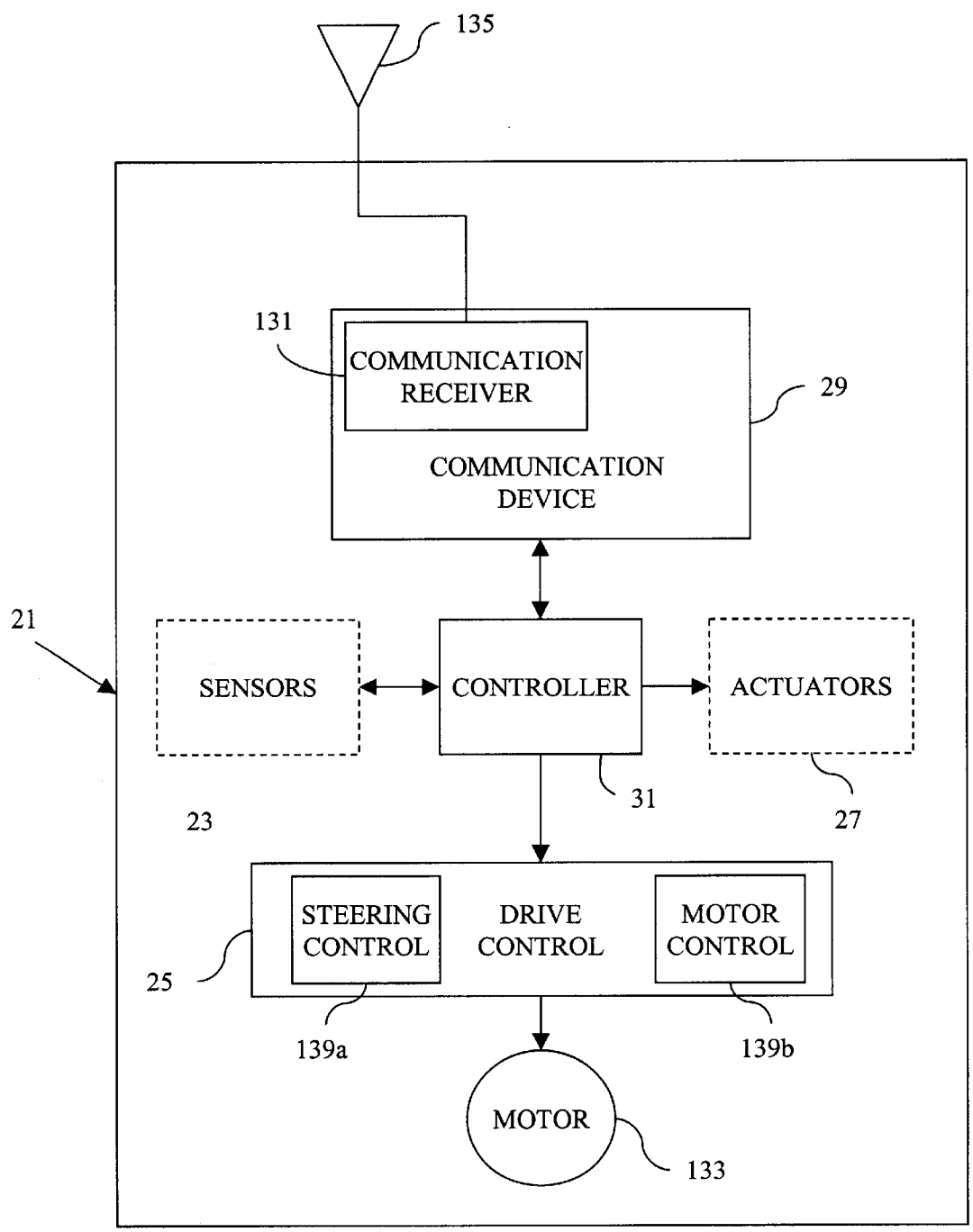
FIG. 2 illustrates a block diagram of one embodiment of a vehicle of the present invention.

FIG. 2 illustrates a block diagram of one embodiment of the vehicle of the present invention. The vehicle 21 includes a drive control 25, a communication device 29 and a controller 31. The drive control 25 manipulates or controls the movement of the vehicle 21, e.g., moving the vehicle forward or backwards. The drive control 25 includes, for example, a motor and wheels. The communication device 29 allows the vehicle 21 to transmit information and to receive information. The information transmitted by the communication device 29 is provided by the controller 31. Likewise, the information received by the communication device 29 is provided to the controller 31. The controller 31 is also coupled to the drive control 25 and is configured to command the drive control to place the vehicle in motion, e.g., affect the vehicle's current motion or halt the vehicle's motion. In one embodiment, the information received by the communication device 29 contains data from a communication node (not shown). Using the information received, the controller 31 is configured to process or analyze the information received.

For instance, the communication device receives information transmitted by a communication node. The information contains data about the location of the communication node. The controller retains the information of location of the communication node including the location of a previous communication node and the vehicle's actual position. In one embodiment, the vehicle's relative location is determined by using sensors 23, such as odometric sensors, to track the distance and direction which the vehicle has traveled. Based on the positional information of the nodes and the vehicle's location, the controller 31 determines if any correction or adjustment is needed in regards to the vehicle's relative location, such as a correction in the vehicle's position and/or heading. If correction or adjustment is needed, the controller updates the vehicle's relative location. Such updating reduces the propagation of positional error and heading error as the vehicle moves throughout the environment.

In one embodiment, the controller 31 is configured to use a closed loop motion system in which vector distance to a destination is calculated and steering and translational speed is determined based on the calculated vector distance. In one embodiment, steering speed represents the velocity at which the vehicle is moving in an angular direction, i.e., turning. Translational speed, in one embodiment, represents the velocity at which the vehicle is moving forward or in reverse.

Figures 3A, 3B:
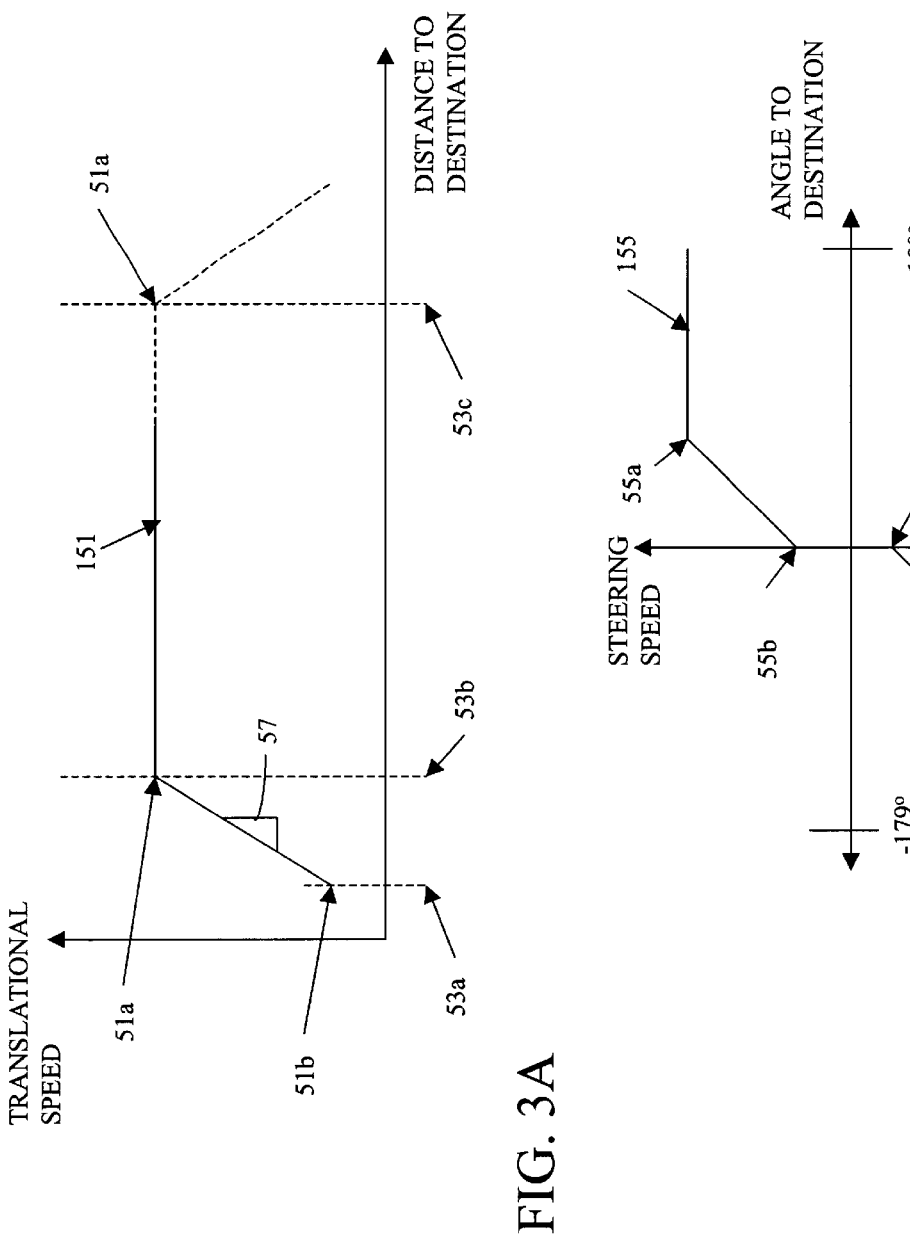
FIG. 3A illustrates one embodiment of a speed calculation function for determining translational speed relative to the distance to a destination.
FIG. 3B illustrates one embodiment of a speed calculation function for determining steering speed relative to the angle to a destination.

The positional location of a destination, e.g., a communication node, is received from another communication node. The distance to the destination from the vehicle is preferably measured in inches as an offset of the location of the destination in relation to the relative location of the vehicle. The angle to the destination is preferably measured in degrees as an offset of the location of the destination relative to the heading of the vehicle. Translational speed calculation function 151 and steering speed calculation function 155, as shown in FIGS. 3A and 3B, respectively, are utilized. The respective functions determine steer speed and translational speed using predetermined parameters and the measured angle and distance to the destination. The predetermined parameters include minimal distance 53a, minimal speed 51b, minimal steer speed 55b, maximum speed 51a, brake 57, and maximum steer speed 55a. A tradeoff between speed and accuracy of motion is controlled through the manipulation of these predetermined parameters.

The translational speed calculation function 151 to determine the translational speed is a linear relationship with the distance to the destination, as illustrated in FIG. 3A. As shown in FIG. 3A, a vehicle accelerates, i.e. changes translational speed, up to the maximum speed 51a as the vehicle approaches from a distance 53c from the destination. As the vehicle reaches a distance 53b from the destination, the vehicle slows down, i.e. changes translational speed, by reducing translational speed of the vehicle from the maximum speed 51a to the minimal speed 51b. In other words, the vehicle applies brake 57, which corresponds to the slope of the speed calculation function 151.

In FIG. 3B, the speed calculation function 155 to determine the steering speed is a linear relationship with the angle to the destination. As shown in FIG. 3B, the steering speed of the vehicle is increased from a range delimited by a minimum steer speed 55b to a maximum steer speed 55a, for angles to the destination between 0 degrees to 180 degrees. For angles to the destination between 0 degrees to −179 degrees, the steering speed of the vehicle increases from a range delimited by a minimum steer speed 55b to a maximum steer speed 55a but in reverse.

Once the steering and translational speed or velocity are determined, in one embodiment, the drive control converts these velocities to angular and linear values in terms of motor and wheel motions to move the vehicle. For instance, for a vehicle having only two wheels, the drive control drives the motor to move or rotate the wheels to place the vehicle in motion. With respect to the linear values, the drive control moves the vehicle forward by rotating the wheels at a specific speed in one direction and in reverse by rotating the wheels at a specific speed in the opposite direction. With respect to the angular values, the drive control turns the vehicle by causing one wheel to rotate faster than the other wheel on the vehicle. When the vehicle gets close enough to a destination such that the distance is less than some threshold distance, then the controller determines that it has arrived at its destination.

Referring back to FIG. 2, the sensors 23 include, for example, motion detectors, infrared sensors, ultrasonic detectors, tactile sensors, odometric sensors or video imaging systems. The sensors 23 are coupled to the controller 31 such that information gathered from the sensors, e.g., distance to an obstacle, is provided to the controller 31. The controller 31 is also able to control the sensors 23 such as turning on and off a sensor or directing a sensor to point in a specific direction. The controller 31 is also capable of providing the information gathered from the sensors to the communication device 29. The communication device is thereby able to transmit the information to a communication node (not shown), such that the communication node is thus, for example, updated or appraised of any environmental information that the sensors 23 may have gathered.

In one embodiment, the vehicle 21 also includes actuators 27. The actuators 27 include, for example, robotic arms and claws that permit the vehicle 21 to manipulate items or objects in the environment. For example, the actuators 27 in one embodiment is configured to grab a product from a shelf. The controller 31 is coupled to the actuators and is configured to control the actions of the actuators, such as picking up a specific object. In one embodiment, the controller receives commands to control the actions of the actuators from the communication device 29. As noted above, the communication device 29 receives information from a communication node. The information received, in the embodiment described, includes vehicle control data used by the controller to control the actions of the actuators.

Alternatively or in addition to, the controller is configured with one or more control commands to control the actions of the actuators. As such, at predetermined locations, times or conditions, the controller 31 is able to activate or control the actuators to perform a specific task. In one embodiment, the predetermined locations, times or conditions are provided by the information received by the communication device 29.

The vehicle control data could also resemble a computer program such that each node represents an instruction or a series of instructions by which the vehicle is operated in the environment. For example, referring back to FIG. 1, communication node 19d contains vehicle control data to pick up an object 11 and then move to communication node 19c. After picking up the object 11 and moving to communication node 19c, the vehicle communicates with the communication node 19c. Communication node 19c contains vehicle control data to command the vehicle to drop the object 11 at location 17a and to pick another object at location 17b. Therefore, the vehicle performs a series of commands that resemble a line by line execution of a computer program that could be stored on the vehicle itself. Hence, by distributing the storage of the instructions throughout the environment, the vehicle no longer needs to have an on-board computer program. Likewise, minimal or no mass memory is needed to store the on-board computer program. As a result, the cost of the vehicle is reduced as well as the computing power necessary to execute the on-board computer program.

Furthermore, the vehicle control data could also resemble a super command word such that each node is provided the super command word by a vehicle to command all the other vehicles in the environment. For example, communication node 19d initially contains vehicle control data to pick up an object 11. A vehicle 5a containing a super command word, e.g., return home, communicates with the communication node 19d. Communication node 19d updates the vehicle command data to include the super word command, return home. The vehicle 5a continues to other communication nodes in the environment and communicates the super command word to each communication node the vehicle 5a encounters. As other vehicles, e.g., vehicles 5b–5c, encounter and communicate with the communication nodes containing the super command word, each vehicle receives and executes the super command word. Hence, if the super command word was a return home command, instructing all vehicles to return to a predetermined command central location, each vehicle would return without having to be individually instructed or individually located. Therefore, the super command word or any command is effectively propagated throughout the communication nodes in the environment. As a result, a tremendous amount of flexibility and adaptability in the control of one or more vehicles is provided.

Referring back to FIG. 2, in one embodiment, the communication device 29 includes a communication receiver 131. The communication receiver is coupled an antenna 135. The antenna 135 transmits and receives radio signals. The size and shape of the antenna 135 varies and as such so does the signal strength and range of the antenna 135. The radio signals received by an antenna 135 are transferred to the communication receiver 131. The communication receiver interprets the received radio signals to determine if any information contained on the radio signals pertains to the vehicle 21. Any relevant information received by the communication receiver 131 is transferred to the controller 31.

Also, in one embodiment, the controller 31 includes a steering control 139a and a motor control 139b. The controller is coupled to a motor 133. Based on information received from the communication receiver, the vehicle controller along with the steering control and motor control causes the motor to move the vehicle, halt the vehicle and/or move the vehicle for a specific distance, at a specific velocity and/or at specific acceleration. The controller is also configured to transfer information to the communication receiver 131. The communication receiver modulates the information received from the controller 139 onto a carrier signal which is broadcasted from the antenna 135. In one embodiment, the vehicle 21 includes a micro-reader (model number RI-STU-MRD1), manufactured by Texas Instruments, Inc. of Dallas, Tex., that acts as the communication device 29 to communicate between communication nodes and the vehicle. The micro-reader is coupled to the controller 31 and transmits information from the controller. Similarly, the micro-reader receives information transmitted from a communication node and transfers the information to the controller 31.

III. Communication Node

Figure 4:
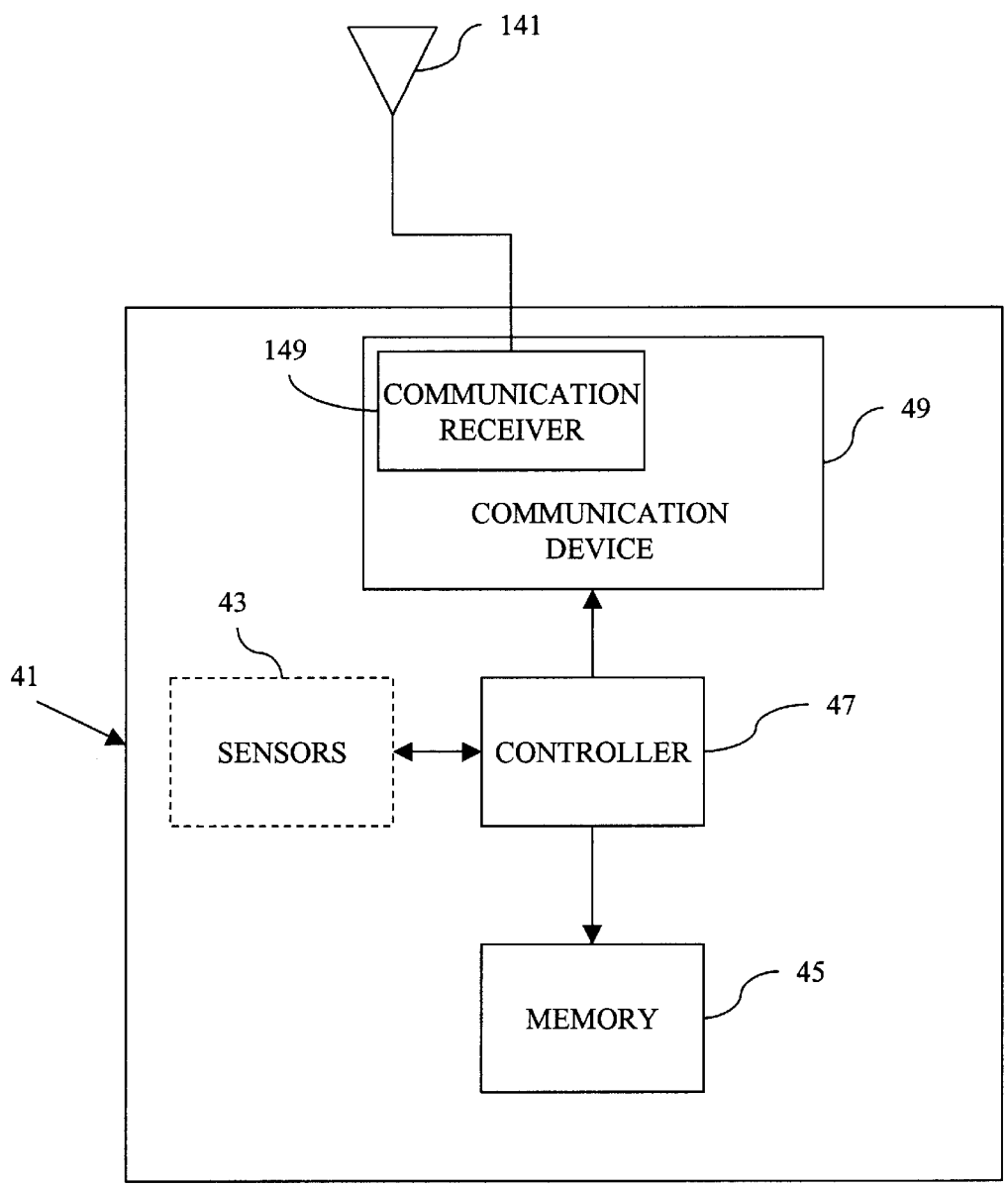
FIG. 4 illustrates a block diagram of one embodiment of a communication node of the present invention.

FIG. 4 illustrates a block diagram of one embodiment of a communication node of the present invention. The communication node 41 includes a memory 45, a controller 47 and a communication device 49. The communication device 49 transmits information provided by the controller 47. The controller 47 fetches or retrieves information transmitted by the communication device 49 from the memory 45. The communication device is also capable of receiving information provided by an external source such as a vehicle (not shown). The information received by a communication device is transferred to the controller 47. The controller 47 determines if the information received is to be stored in memory 45. The controller 47 also determines if specific portions of the memory 45 should be updated by the information received by the communication device 49. In one embodiment, sensors 43 are also coupled to the controller 47. The sensors 43 include, for example, motion detectors and/or video imaging systems which gather information about the environment. The information gathered or detected by the sensors 43 are provided to the controller 47. The controller 47 processes the information and stores the information in memory 45. Alternatively, the controller transfers the information to the communication device 49 for transmitting to an external source. The controller 47 is also capable of manipulating the sensors 43 such as turning on or off the sensors or directing the sensors to observe or detect a specific portion of the environment.

In one embodiment, the communication device 49 contains a communication receiver 149. An antenna 141 is coupled to the communication receiver that is capable of receiving and transmitting radio signals. The size and shape of the antenna 141 varies and as such so does the signal strength and range of the communication receiver 149. The communication receiver 149 interprets the radio signals received by the antenna 141 to determine if the information contained on the radio signals pertains to the communication node 41. Information concerning the communication node 41 received by the communication receiver 149 is transferred to the controller 47.

The controller 47 updates or stores the information in the memory 45. In one embodiment, the memory 45 is a random access memory (RAM). The controller 47 also fetches information from the memory 45 and transfers the information to the communication receiver 149. The communication receiver 149 upon receipt of the information from the controller modulates the information on the carrier of the radio signal for transmitting by the antenna 141. As previously noted, in one embodiment, sensors 43 are coupled to the controller 47. The sensors 43 provide information concerning the environment to the controller 47. The controller 47 either transmits the information through the communication receiver 149 or stores the information in memory 45.

In one embodiment, the communication node 41 is entirely contained in a hermetically sealed glass which protects the communication node from floor cleaning products and accidental liquid spills. Also, in one embodiment, the communication node is a passive Radio Frequency Identification (RFID) transponder with 80 bits of read/write memory and an effective read range of up to six inches. One example of an RFID is described in U.S. Pat. No. 5,825,298 issued to Walter, the disclosure of which is herein incorporated by reference. In one embodiment, the RFID (model number RI TRP-WR2B) is manufactured by Texas Instruments, Inc. of Dallas, Tex. The read/write memory is provided as 80 bits or 10 bytes of data stored in the memory of the communication node.

Figure 5:
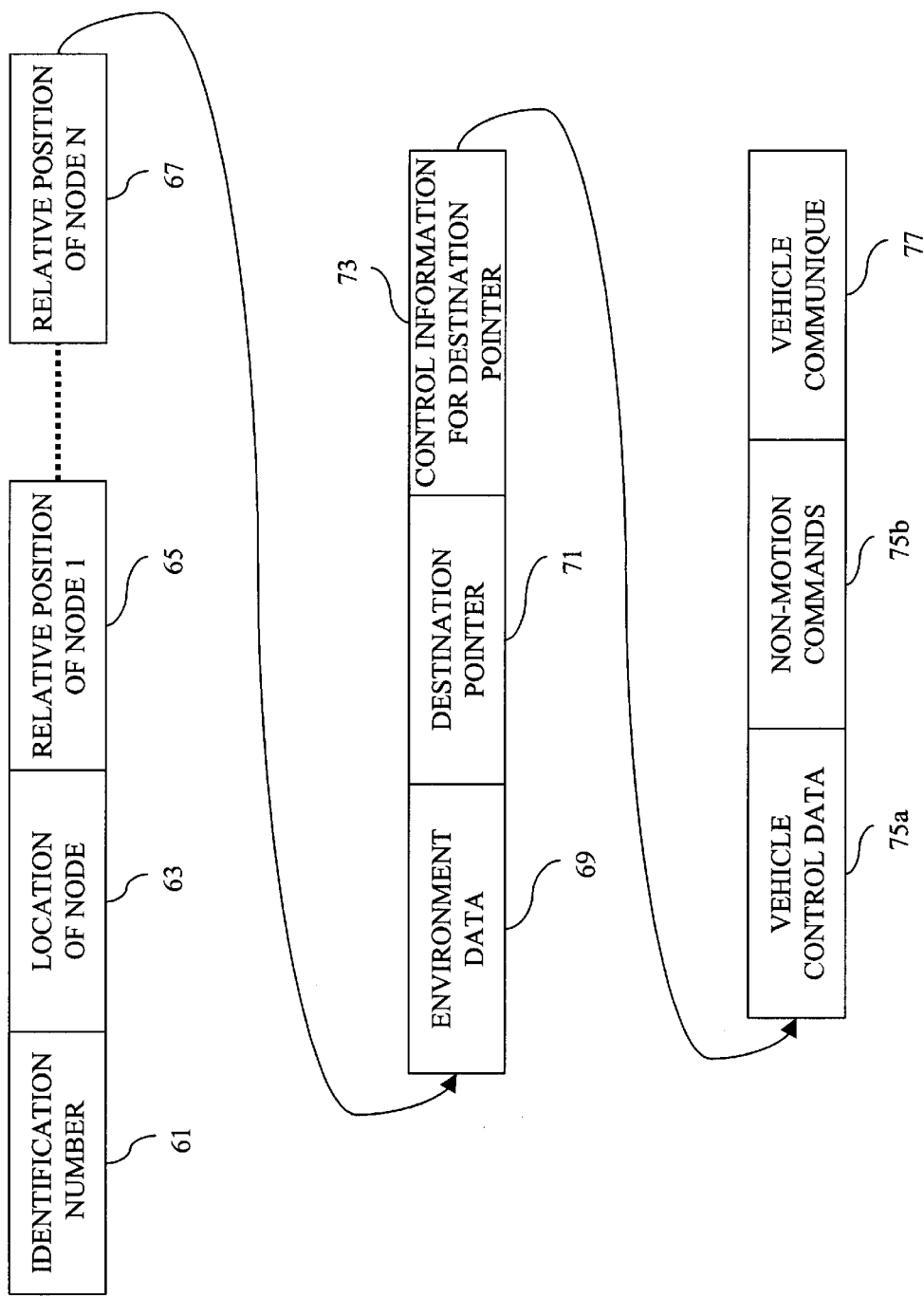
FIG. 5 illustrates a data structure of one embodiment of memory of a communication node in FIG. 4.

FIG. 5 illustrates one example of the layout or data structure of the memory in the communication node of the present invention. In the memory, the unique identification number 61 of the communication node and the location of the node 63 in a world reference frame are stored. In other bit locations of memory, relative positions of other communication nodes 65–67 closest to the communication node are stored (e.g., X and Y integer values for the other communication nodes ranging from −7 to +7 feet). Environment data 69, e.g., the location of other objects, is stored in the next bits of memory. The other bits of memory store a destination pointer 71 pointing to the relative position of one of the other communication nodes. In one embodiment, control information 73 on how to update destination pointer 71 to point to another destination is stored in the memory. Additionally, the memory includes vehicle communique 77. Vehicle command data 75a used to inform a vehicle how to move and/or act is also stored in memory. The vehicle command data 75a, in one embodiment, also includes non-motion commands 75b. In one embodiment, the non-motion commands 75b trigger specific commands in a vehicle. In addition or alternatively, the non-motion commands are provided to a vehicle to be interpreted by the vehicle. The non-motion commands are for any non-motion functionality to be performed by a vehicle. In one embodiment, only the vehicle command data and the non-motion commands are capable of being modified.

Hence, as shown in FIG. 5, the communication nodes, specifically the memory included in the communication nodes, provide a large array of information. As previously mentioned, a vehicle capable of communicating to the communication nodes, is capable of reading and re-writing or updating the information contained with the memory. For example, if a vehicle has new information regarding the environment, such as a location of a new object, the vehicle transmits the environment information to the communication node. The communication node then updates the environment data 69. Similarly, if the vehicle has vehicle communique or vehicle control data, the vehicle can transmit the information to the communication node. The communication node then respectively updates the vehicle communique 77 or the vehicle control data 75a.

Furthermore, the vehicle by reading the communication node is provided with node position information regarding the location of a communication node 63 and relative positions of other communication nodes 65–67. Using the node position information, the vehicle is able to travel from one communication node to another communication node. Thus, the node position information resembles virtual links from one communication node to other neighboring communication nodes.

Also, a vehicle by reading the communication node is provided with a destination pointer 71 pointing to the relative position of one of the other communication nodes. Using the destination pointer, the vehicle is also able to travel from one communication node and to another specific destination communication node. However, the destination pointer resembles a predetermined path from one communication node to another communication node rather than a set of virtual links from one communication node to any one of a number of neighboring communication nodes. The control information 73 provides the vehicle or other vehicles the capability to update the path. By utilizing the control information 73, a vehicle updates the destination pointer 71. Thus, the path can be changed, for example, referring to FIG. 1, from communication node 19a to destination communication node 19b to communication node 19a to destination communication node 19c.

As such, a communication node which is re-visited may direct a vehicle to a different destination than the previous destination directed by the communication node when the vehicle previously visited the communication node. For example, communication node 19d has a destination pointer providing the destination location of communication node 19c. The vehicle reads the destination information and before moving to communication node 19c, the vehicle communicates with the communication node 19d to update the destination pointer to point to communication node 19a. Hence, when the vehicle re-visits the communication node 19d, the vehicle reads the destination pointer and thus is directed to the communication node 19a instead of communication node 19c. Furthermore, as the environment changes, e.g., a communication node is added or removed, the vehicle is able to transmit the information regarding the removed or addition of a communication node to update the memory in the communication nodes. For instance, the destination pointer is updated and/or the relative positions of other neighboring nodes are updated. Therefore, virtual links or paths can be created and changed as a vehicle moves throughout the environment.

IV. The Process

Figure 6:
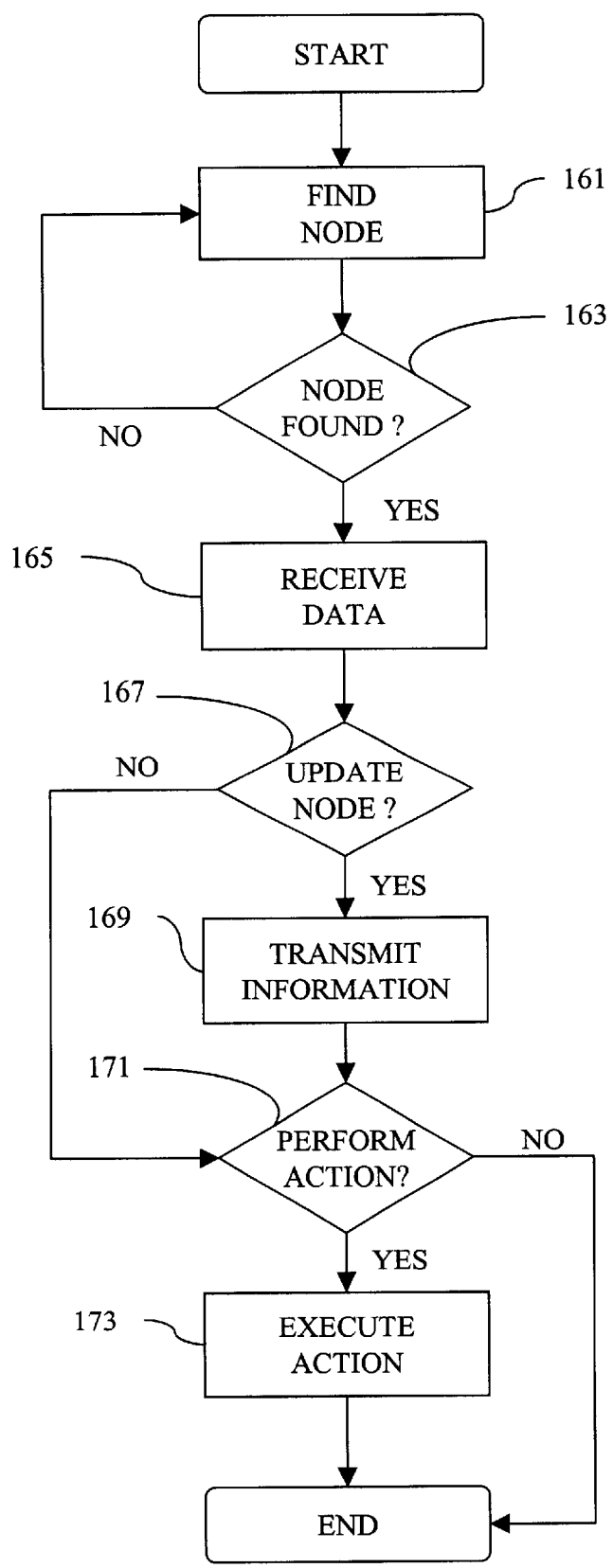
FIG. 6 illustrates a flow diagram of one embodiment of an overview process of traversing a transit system of the present invention.

FIG. 6 illustrates a flow diagram of an overview process of the present invention. In step 161, the process attempts to locate a communication node. In step 163, the process determines if a node is found. If, in step 163, the process determines that a communication node is not found, the process repeats step 161 and attempts to locate a communication node. If, in step 163, the process determines that a communication node is found, the process receives information transmitted from the communication node found in step 163. The process, in step 167, after receiving the information from the communication node, determines if the communication node is to be updated. If the communication node is not to be updated as determined by the process in step 167 the process continues to step 171. In step 171, the process determines if a specific action, such as moving an object, is to be performed. If a specific action is to be performed then the process executes the specific action in step 173 and then the process ends. Similarly, if, in step 171, the process determines that no specific action needs to be performed, the process ends.

If, in step 167, the process determines that the communication node is to be updated, the process, in step 169, transmits specific information to the communication node. The information transmitted is intended to update existing information on the communication node (step 163). After transmitting the information, in step 169, the process determines, in step 171, if a specific action is be to performed. If a specific action does not need to be performed, the process ends.

Figure 7:
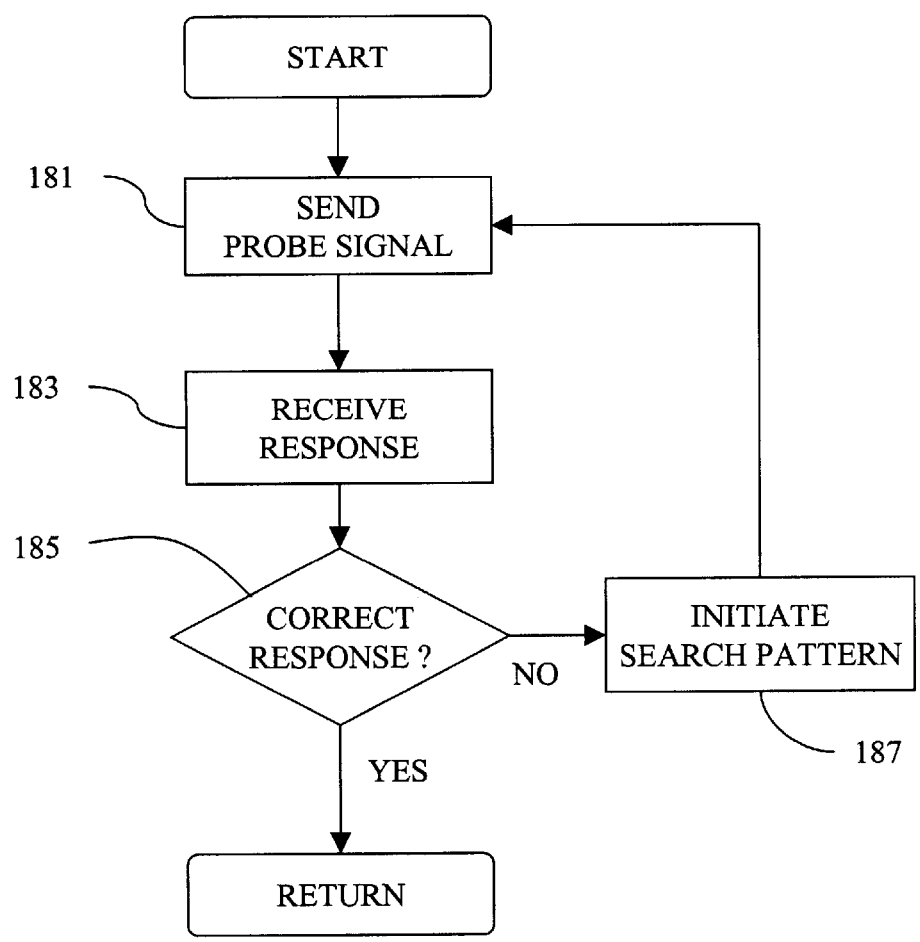
FIG. 7 illustrates a flow diagram of one embodiment of a sub-process locating a communication node in the transit system of the present invention.

FIG. 7 illustrates a sub-process detailing step 161 in FIG. 6 of locating a communication node. In step 181, the process sends a probe or initiate signal. In step 183, the process receives responses from communication nodes. In step 185, the process determines if the response received (step 183) is the correct response. In one embodiment, the correct response is an acknowledgment signal from a communication node that received the probe signal (step 181). If, in step 185, the process determines that the correct response is received, then the process returns. If the sub-process in step 185 determines that a correct response has not been received then the process initiates a search pattern in step 187. In one embodiment, the search pattern initiated is a star type search pattern. After initiating the search pattern in step 187, the process repeats by sending a probe signal in step 181.

Figure 8:
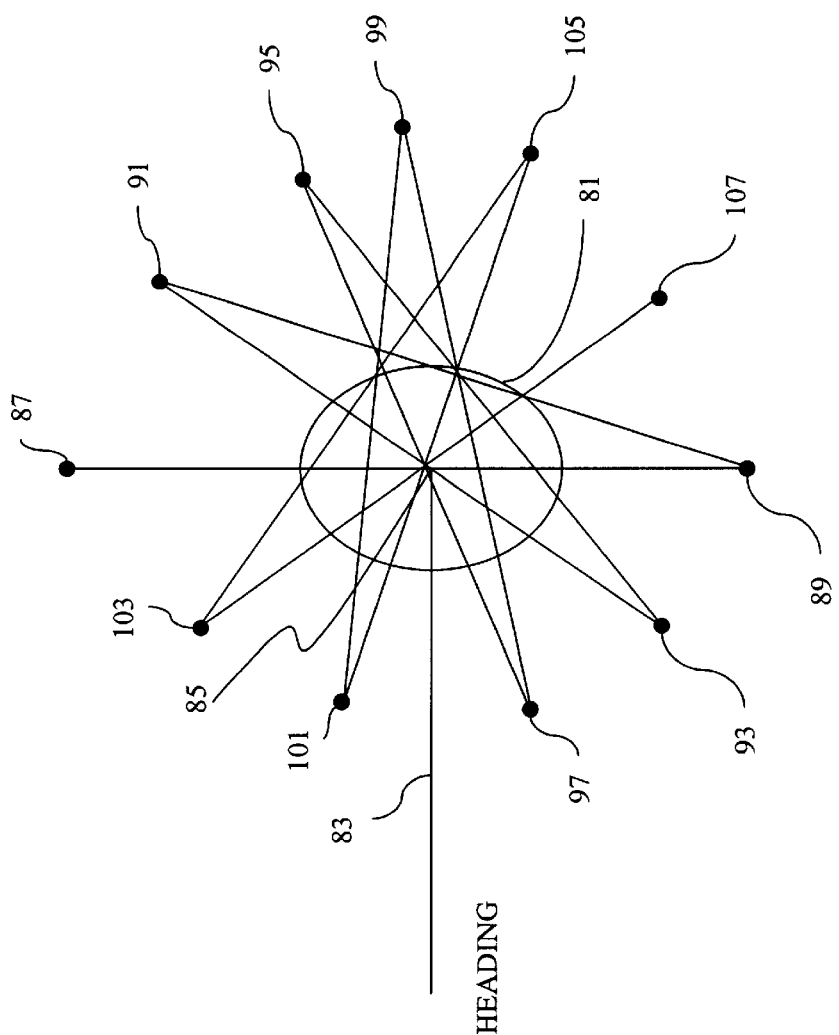
FIG. 8 illustrates one embodiment of a search pattern motion used to locate a communication node of the present invention.

FIG. 8 illustrates an example of a star type search pattern initiated by the process in FIG. 7. The search pattern is initiated often when the error propagation from motion creates a large error that the vehicle does not move within range of the target communication node. In other words, the vehicle is unable to find a communication node. In FIG. 8, oval 81 represents error distribution elongated along the direction perpendicular to the vehicle's original heading 83. In other words, oval 81 represents the maximum probability that the actual destination, i.e., the communication node, is within the oval 81. If the vehicle does not find the communication node at point 85, the vehicle turns 90 degrees and moves to point 87. The perpendicular turn, i.e. the 90 degrees turn from point 85 to point 87, adjusts for the propagation of small angular errors that usually results in a positional error that can leave the vehicle to either side of the target communication node after the vehicle has traveled a large distance from the last communication node.

As the vehicle moves from point to point, the vehicle transmits an initiate signal to locate the communication node. If a response is received, the star type search pattern is terminated. Once the vehicle reaches point 87, the vehicle moves in reverse to point 89. At point 89, the vehicle rotates a few degrees and moves to point 91. At point 91, the vehicle rotates a few degrees and moves in reverse to point 93. The vehicle continues in this manner until all the points 95 to 107 are reached or until the communication node is found. The star type search pattern causes the vehicle to rotate at distinct points and at a complete stop. Thus, the amount of angular error that can be introduced by the vehicle being in motion is reduced as compared to other types of search patterns, such as a spiral search pattern.

Figure 9:
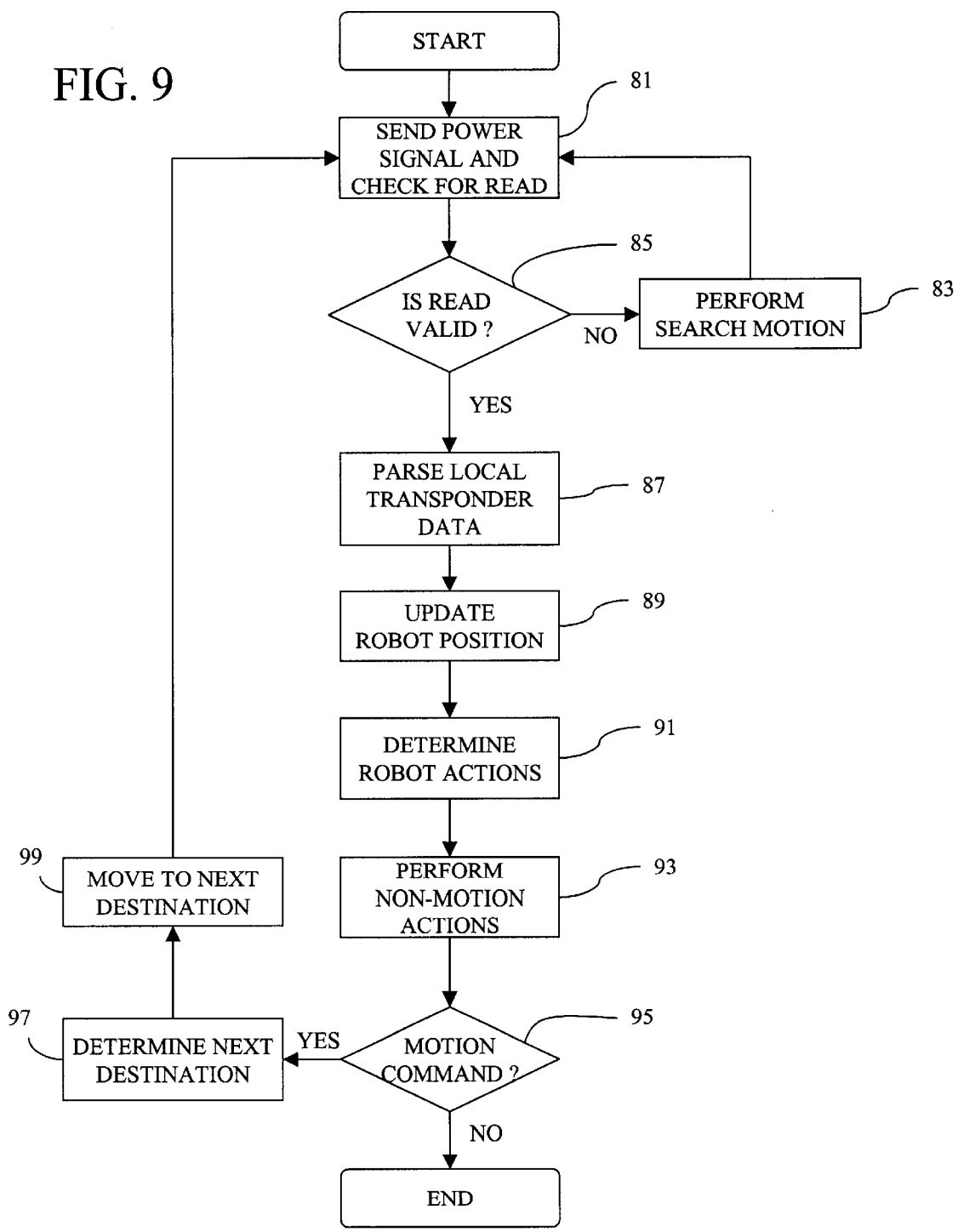
FIG. 9 illustrates a flow diagram of one embodiment of a detailed process of traversing a transit system of the present invention.

FIG. 9 illustrates a flow diagram detailing one embodiment of a detailed process operating in a transit system of the present invention. In step 81, the process sends a power signal and checks for a read signal. In one embodiment, the power signal is an electrical oscillation out of an antenna having a frequency of 50Hz. The read signal, in one embodiment, is the transferring of the entire memory contents of the communication node. In step 85, the process determines if the read signal is valid. If the process determines that the read signal is not valid in step 85, the process performs a search motion in step 83. In one embodiment, the search motion performed in step 83 is similar to the sub-process illustrated in FIG. 7. If the read signal is determined to be valid by the process in step 85, the process parses local transponder data received from a communication node in step 87. In step 89, the process updates the vehicle position using the parsed local transponder data. The process continues in step 91 to determines if actions are needed to be performed by the vehicle using the parsed local transponder data. In step 93, the process causes the vehicle to perform any non-motion actions, i.e., actions performed by the vehicle that does not require the vehicle to move. Once non-motion actions have been performed, the process, in step 95, determines if a motion command also needs to be performed. If a motion command does not need to be performed then the process ends. However, if the process determines in step 95 that a motion command needs to be performed, then the process in step 97 determines the next destination from the local transponder data received in step 89 and the updated robot position in step 87. In step 99 the process causes the robot to move to the next destination determined (step 97). The process then repeats continuing to step 81 sending a power signal and checking for a read signal.

Figure 10:
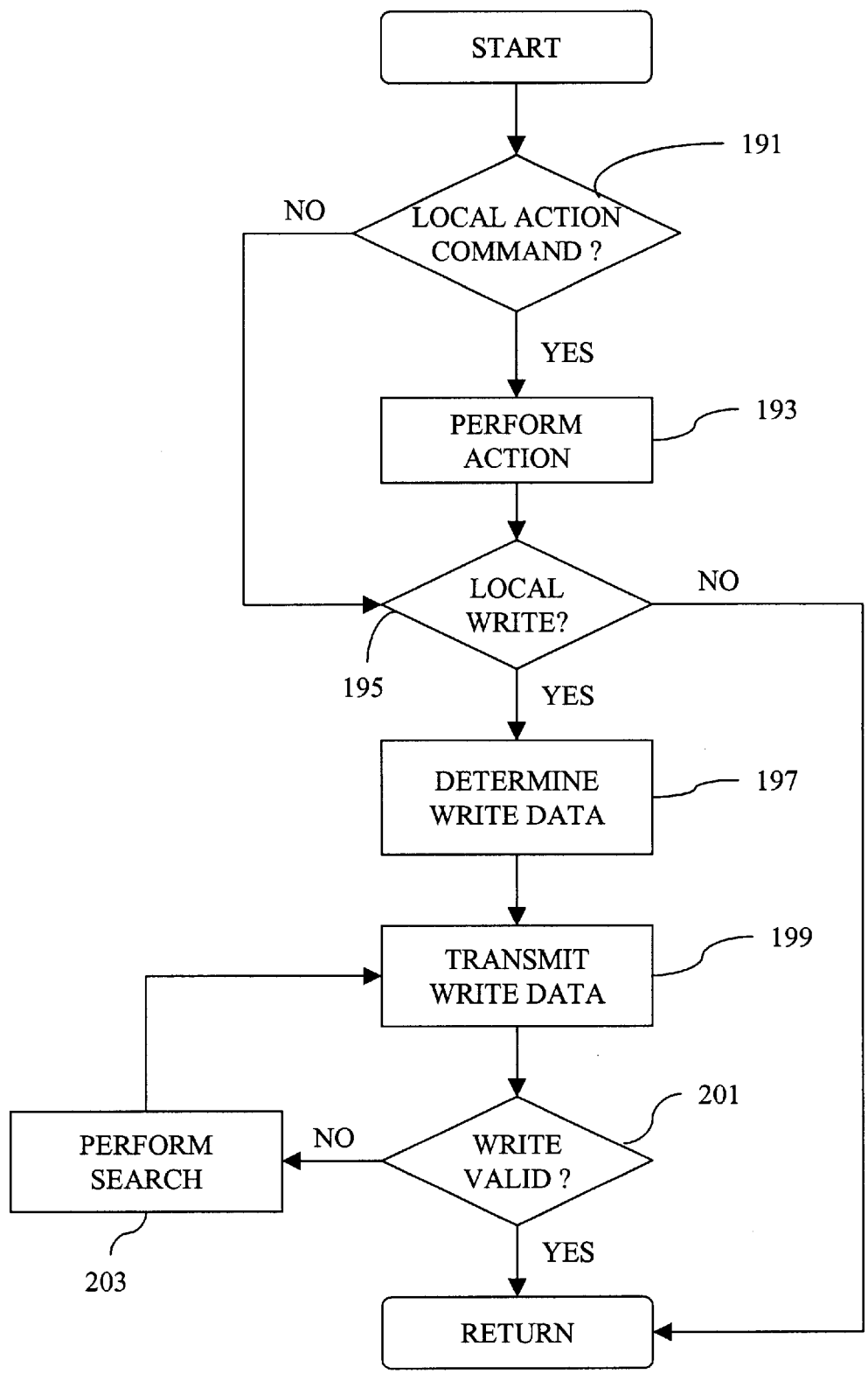
FIG. 10 illustrates a flow diagram of one embodiment of a detailed process of non-motion actions including indirect vehicle communication for the transit system of the present invention.

FIG. 10 illustrates a preferred flow diagram detailing step 93 in FIG. 9 of performing non-motion actions. The sub-process, in step 191, determines if a local action command has been received from a communication node. If the sub-process, in step 191, determines that a local action command is not received, then the sub-process continues to step 195 to determine if a local write is to be performed. However, if, in step 191, the sub-process determines that a local action command has been received, then the sub-process performs an action in step 191. Once the action has been performed in step 193 by the sub-process, the sub-process determines in step 195 if a local write to a communication node is to be performed. If a local write does not need to be performed, then the sub-process returns. However, if the sub-process determines that a local write needs to be performed, in step 195, then the sub-process determines, in step 197, what specific data needs to be written to the communication node. In step 199, the sub-process transmits the data determined (step 197) to the communication node. Once the data has been transmitted in step 199, the sub-process determines if the write is valid in step 201. In one embodiment, a write is valid, if the process receives an acknowledgment signal verifying that the write has been performed. If the sub-process, in step 201, determines that the write is not valid, the sub-process performs a search pattern in step 203 and continues to step 199 to transmit the data determined (step 197). The search pattern initiated is identical to the star type pattern previously described in reference to FIG. 7, but the initial perpendicular turn is not preformed. In one embodiment, the read range is greater than the write range and sometimes the vehicle has detected a communication node after a search pattern in step 203 (primary search). However, the vehicle is not quite close enough for a successful write. In these cases, the positional error due to small angle errors has potentially been reduced by the primary search and is therefore no longer the clear dominant error. Therefore an initial perpendicular turn would introduce more angular error to the vehicle, but without the overriding probabilistic benefits that the turn offered in the primary search. However, if the sub-process in step 201 determines that the write is valid, the sub-process returns.

Accordingly, the present invention provides a transit system. Although this invention has been described in certain specific embodiments, many additional modifications and variations would be apparent to those skilled in the art. It is therefore to be understood that this invention may be practiced otherwise than specifically described. Thus, the present embodiments of the invention should be considered in all respects as illustrative and not restrictive, the scope of the invention to be determined by the appended claims and their equivalents rather than the foregoing description.

What is claimed is:

1. A transit system comprising:
    a plurality of communication nodes, each of the plurality of communication nodes including:
        a node memory able to store information,
        a node communication device configured to receive information, and
        a node controller coupled to the node memory and the node communication device;
    a plurality of vehicles, each of the plurality of vehicles including:
        a vehicle communication device able to transmit information, and
        a vehicle controller coupled to the vehicle communication device, the vehicle controller configured to cause the vehicle communication device to transmit information to one of the plurality of communication nodes;
    wherein the node controller of the one of the plurality of communication nodes is configured to update portions of the node memory with information from a first one of the plurality of vehicles;
    wherein the node communication device of each of the plurality of communication nodes is further configured to transmit information, such that the information includes messages for a second one of the plurality of vehicles from a first one of the plurality of vehicles;
    wherein the vehicle communication device of each of the plurality of vehicles is further able to receive information transmitted from the node communication device;
    wherein the vehicle controller of each of the plurality of vehicles is further configured to interpret information transmitted from at least one of the plurality of communication nodes;
    wherein the vehicle controller of each of the plurality of vehicles is further configured to manipulate each of the plurality of vehicles according to the information transmitted;
    wherein the node memory of one of the plurality of communication nodes stores information that includes position indicators and the node communication device of the one of the plurality of communication nodes transmits the position indicators;
    wherein the position indicators include heading and distance parameters from the one of the plurality of communication nodes to another one of the plurality communication nodes;
    wherein the position indicators further include reference values identifying a specific location of the one of the plurality of communication nodes relative to a center reference point;
    wherein the vehicle controller of one of the plurality of vehicles is further configured to determine an absolute position of the one of the plurality of vehicles based on the transmitted position indicators;
    wherein the vehicle controller of one of the plurality of vehicles is further configured to determine positional information of a first one of the plurality of communication nodes based on the absolute position of the one of the plurality of vehicles, and the positional information of the first one of the plurality of communication nodes is transmitted to a second one of the plurality of communication nodes, such that the node controller of the second one of the plurality of communication nodes updates its node memory with the transmitted positional information.

2. The transit system of claim 1 wherein the vehicle controller of one of the plurality of vehicles is further configured to determine heading and distance from the one of the plurality of vehicles to the second one of the plurality of communication nodes based on heading and distance information from the first one of the plurality of communication nodes.

3. A transit system comprising:
    a plurality of communication nodes, each of the plurality of communication nodes including:
        a node memory able to store information,
        a node communication device configured to receive information, and
        a node controller coupled to the node memory and the node communication device;
    a plurality of vehicles, each of the plurality of vehicles including:
        a vehicle communication device able to transmit information, and
        a vehicle controller coupled to the vehicle communication device, the vehicle controller configured to cause the vehicle communication device to transmit information to one of the plurality of communication nodes;
    wherein the node controller of the one of the plurality of communication nodes is configured to update portions of the node memory with information from a first one of the plurality of vehicles;
    wherein the node communication device of each of the plurality of communication nodes is further configured to transmit information, such that the information includes messages for a second one of the plurality of vehicles from a first one of the plurality of vehicles;
    wherein the vehicle communication device of each of the plurality of vehicles is further able to receive information transmitted from the node communication device;
    wherein the vehicle controller of each of the plurality of vehicles is further configured to interpret information transmitted from at least one of the plurality of communication nodes;
    wherein the vehicle controller of each of the plurality of vehicles is further configured to manipulate each of the plurality of vehicles according to the information transmitted;
    wherein the node memory of one of the plurality of communication nodes stores information that includes environmental data and the node communication device of the one of the plurality of communication nodes transmits the environmental data.

4. The transit system of claim 3 wherein the environmental data include at least one of a terrain type for a select portion of an environment and heading and distance parameters to an object from the one of the plurality of communication nodes.

5. The transit system of claim 4 wherein the vehicle controller of one of the plurality of vehicles is further configured to determine heading and distance from the one of the plurality of the vehicles to the object based on the environmental data transmitted.

6. The transit system of claim 5 wherein the vehicle controller of each of the plurality of vehicles is further configured to perform a predetermined action based on the environmental data transmitted.

7. The transit system of claim 6 wherein the vehicle communication device of one of the plurality of vehicles is further configured to transmit the environmental data to another one of the plurality of communication nodes, such that the node communication device of the another one of the plurality of communication nodes causes its node memory to store the environmental data.

8. The transit system of claim 7 wherein the vehicle communication device of one of the plurality of vehicles transmits information that includes additional environmental data to the one of the plurality of communication nodes, such that the node memory of the one of the plurality of communication nodes updates the environmental data stored in response to the additional environmental data transmitted.

9. A transit system comprising:
   a plurality of communication nodes, each of the plurality of communication nodes including:
      a node memory able to store information,
      a node communication device configured to receive information, and
      a node controller coupled to the node memory and the node communication device;
   a plurality of vehicles, each of the plurality of vehicles including:
      a vehicle communication device able to transmit information, and
      a vehicle controller coupled to the vehicle communication device, the vehicle controller configured to cause the vehicle communication device to transmit information to one of the plurality of communication nodes;
   wherein the node controller of the one of the plurality of communication nodes is configured to update portions of the node memory with information from a first one of the plurality of vehicles;
   wherein the node communication device of each of the plurality of communication nodes is further configured to transmit information, such that the information includes messages for a second one of the plurality of vehicles from a first one of the plurality of vehicles;
   wherein the vehicle communication device of each of the plurality of vehicles is further able to receive information transmitted from the node communication device;
   wherein the vehicle controller of each of the plurality of vehicles is further configured to interpret information transmitted from at least one of the plurality of communication nodes;
   wherein the vehicle controller of each of the plurality of vehicles is further configured to manipulate each of the plurality of vehicles according to the information transmitted;
   wherein the node memory of one of the plurality of communication nodes stores information that includes control commands and the node communication device of the one of the plurality of communication nodes transmits the control commands;
   wherein the vehicle controller of each of the plurality of vehicles is further configured to cause each of the plurality of vehicles to perform specific actions based on the control commands transmitted;
   wherein the vehicle communication device of one of the plurality of vehicles transmits information that includes additional control commands to the one of the plurality of communication nodes, such that the node memory of the one of the plurality of communication nodes updates the control commands stored in response to the additional control commands transmitted.

10. The transit system of claim 9 wherein the vehicle controller of one of the plurality of vehicles is further configured to generate at least one control command, and that the vehicle communication device is further configured to transmit the at least one control command to one of the plurality of communication nodes, such that the node controller of the one of the plurality of communication nodes updates its node memory with the at least one control command.

11. A transit system comprising:
   a plurality of communication nodes, each of the plurality of communication nodes including:
      a node memory able to store information,
      a node communication device configured to receive information, and
      a node controller coupled to the node memory and the node communication device;
   a plurality of vehicles, each of the plurality of vehicles including:
      a vehicle communication device able to transmit information, and
      a vehicle controller coupled to the vehicle communication device, the vehicle controller configured to cause the vehicle communication device to transmit information to one of the plurality of communication nodes;
   wherein the node controller of the one of the plurality of communication nodes is configured to update portions of the node memory with information from a first one of the plurality of vehicles;
   wherein the node memory of one of the plurality of communication nodes stores information that includes position indicators and the node communication device of the one of the plurality of communication nodes transmits the position indicators;
   wherein the vehicle controller of one of the plurality of vehicles is further configured to determine an absolute position of the one of the plurality of vehicles based on the transmitted position indicators;
   wherein the vehicle controller of one of the plurality of vehicles is further configured to determine positional information of a first one of the plurality of communication nodes based on the absolute position of the one of the plurality of vehicles, and the positional information of the first one of the plurality of communication nodes is transmitted to a second one of the plurality of communication nodes, such that the node controller of the second one of the plurality of communication nodes updates its node memory with the transmitted positional information.

12. The transit system of claim 11 wherein the vehicle controller of one of the plurality of vehicles is further configured to determine heading and distance from the one of the plurality of vehicles to the second one of the plurality of communication nodes based on heading and distance information from the first one of the plurality of communication nodes.

13. A transit system comprising:
a plurality of communication nodes, each of the plurality of communication nodes including:
a node memory able to store information,
a node communication device configured to receive information, and
a node controller coupled to the node memory and the node communication device;
a plurality of vehicles, each of the plurality of vehicles including:
a vehicle communication device able to transmit information, and
a vehicle controller coupled to the vehicle communication device, the vehicle controller configured to cause the vehicle communication device to transmit information to one of the plurality of communication nodes;
wherein the node controller of the one of the plurality of communication nodes is configured to update portions of the node memory with information from a first one of the plurality of vehicles;
wherein the node memory of one of the plurality of communication nodes stores information that includes environmental data and the node communication device of the one of the plurality of communication nodes transmits the environmental data.

14. The transit system of claim 13 wherein the environmental data include at least one of a terrain type for a select portion of an environment and heading and distance parameters to an object from the one of the plurality of communication nodes.

15. The transit system of claim 14 wherein the vehicle controller of one of the plurality of vehicles is further configured to determine heading and distance from the one of the plurality of the vehicles to the object based on the environmental data transmitted.

16. The transit system of claim 14 wherein the vehicle controller of each of the plurality of vehicles is further configured to perform a predetermined action based on the environmental data transmitted.

17. The transit system of claim 14 wherein the vehicle communication device of one of the plurality of vehicles is further configured to transmit the environmental data to another one of the plurality of communication nodes, such that the node communication device of the another one of the plurality of communication nodes causes its node memory to store the environmental data.

18. The transit system of claim 14 wherein the vehicle communication device of one of the plurality of vehicles transmits information that includes additional environmental data to the one of the plurality of communication nodes, such that the node memory of the one of the plurality of communication nodes updates the environmental data stored in response to the additional environmental data transmitted.

19. A transit system comprising:
a plurality of communication nodes, each of the plurality of communication nodes including:
a node memory able to store information,
a node communication device configured to receive information, and
a node controller coupled to the node memory and the node communication device;
a plurality of vehicles, each of the plurality of vehicles including:
a vehicle communication device able to transmit information, and
a vehicle controller coupled to the vehicle communication device, the vehicle controller configured to cause the vehicle communication device to transmit information to one of the plurality of communication nodes;
wherein the node controller of the one of the plurality of communication nodes is configured to update portions of the node memory with information from a first one of the plurality of vehicles;
wherein the node memory of one of the plurality of communication nodes stores information that includes control commands and the node communication device of the one of the plurality of communication nodes transmits the control commands;
wherein the vehicle communication device of one of the plurality of vehicles transmits information that includes additional control commands to the one of the plurality of communication nodes, such that the node memory of the one of the plurality of communication nodes updates the control commands stored in response to the additional control commands transmitted.

20. A transit system comprising:
a plurality of communication nodes, each of the plurality of communication nodes including:
a node memory able to store information,
a node communication device configured to receive information, and
a node controller coupled to the node memory and the node communication device;
a plurality of vehicles, each of the plurality of vehicles including:
a vehicle communication device able to transmit information, and
a vehicle controller coupled to the vehicle communication device, the vehicle controller configured to cause the vehicle communication device to transmit information to one of the plurality of communication nodes;
wherein the node controller of the one of the plurality of communication nodes is configured to update portions of the node memory with information from a first one of the plurality of vehicles;
wherein the vehicle controller of one of the plurality of vehicles is further configured to generate at least one control command, and that the vehicle communication device is further configured to transmit the at least one control command to one of the plurality of communication nodes, such that the node controller of the one of the plurality of communication nodes updates its node memory with the at least one control command.

21. A transit system comprising:
a plurality of communication nodes, each of the plurality of communication nodes including:
  a node memory able to store information,
  a node communication device configured to receive information, and
  a node controller coupled to the node memory and the node communication device;
a plurality of vehicles, each of the plurality of vehicles including:
  a vehicle communication device able to transmit information, and
  a vehicle controller coupled to the vehicle communication device, the vehicle controller configured to cause the vehicle communication device to transmit information to one of the plurality of communication nodes;
  wherein the node controller of the one of the plurality of communication nodes is configured to update portions of the node memory with information from a first one of the plurality of vehicles;
  wherein the node memory of one of the plurality of communication nodes stores information that includes vehicle communique and the node communication device of the one of the plurality of communication nodes transmits the vehicle communique;
  wherein the vehicle communication device of one of the plurality of vehicles transmits information that includes additional vehicle communique to the one of the plurality of communication nodes, such that the node memory of the one of the plurality of communication nodes updates the vehicle communique stored in response to the additional vehicle communique transmitted.

22. The transit system of claim 21 wherein the vehicle controller of each of the plurality of vehicles is further configured to cause each of the plurality of vehicles to perform specific actions based on the vehicle communique transmitted.

23. A transit system comprising:
a plurality of communication nodes, each of the plurality of communication nodes including:
  a node memory able to store information,
  a node communication device configured to receive information, and
  a node controller coupled to the node memory and the node communication device;
a plurality of vehicles, each of the plurality of vehicles including:
  a vehicle communication device able to transmit information, and
  a vehicle controller coupled to the vehicle communication device, the vehicle controller configured to cause the vehicle communication device to transmit information to one of the plurality of communication nodes;
wherein the node controller of the one of the plurality of communication nodes is configured to update portions of the node memory with information from a first one of the plurality of vehicles;
wherein the node communication device of each of the plurality of communication nodes is further configured to transmit information, such that the information includes messages for a second one of the plurality of vehicles from a first one of the plurality of vehicles;
  wherein the messages for the second one of the plurality of vehicles and from the first one of the plurality of vehicles is unchanged by the node communication device.

24. A transit system comprising:
a plurality of communication nodes, each of the plurality of communication nodes including:
  a node memory able to store information,
  a node communication device configured to receive information, and
  a node controller coupled to the node memory and the node communication device;
a plurality of vehicles, each of the plurality of vehicles including:
  a vehicle communication device able to transmit information, and
  a vehicle controller coupled to the vehicle communication device, the vehicle controller configured to cause the vehicle communication device to transmit information to one of the plurality of communication nodes;
  wherein the node controller of the one of the plurality of communication nodes is configured to update portions of the node memory with information from a first one of the plurality of vehicles;
  wherein the node communication device of each of the plurality of communication nodes is further configured to transmit information, such that the information includes messages for a second one of the plurality of vehicles from a first one of the plurality of vehicles;
  wherein the messages comprise raw data received from the first one of the plurality of vehicles and the node memory of each of the plurality of communication nodes is further configured to store the raw data and the node controller of each of the plurality of communication nodes is further configured to retrieve the raw data and cause the node communication device to transmit the raw data to the second one of the plurality of vehicles.

25. A transit system comprising:
a plurality of communication nodes, each of the plurality of communication nodes including:
  a node memory able to store information,
  a node communication device configured to receive information, and
  a node controller coupled to the node memory and the node communication device;
a plurality of vehicles, each of the plurality of vehicles including:
  a vehicle communication device able to transmit information, and
  a vehicle controller coupled to the vehicle communication device, the vehicle controller configured to cause the vehicle communication device to transmit information to one of the plurality of communication nodes;
  wherein the node controller of the one of the plurality of communication nodes is configured to update portions of the node memory with information from a first one of the plurality of vehicles;
  wherein the node communication device of each of the plurality of communication nodes is further configured to transmit information, such that the information includes messages for a second one of the plurality of vehicles from a first one of the plurality of vehicles;
  wherein the vehicle communication device of each of the plurality of vehicles is further able to receive information transmitted from the node communication device;

wherein the vehicle controller of each of the plurality of vehicles is further configured to interpret information transmitted from at least one of the plurality of communication nodes;

wherein the node memory of one of the plurality of communication nodes stores information that includes vehicle communique and the node communication device of the one of the plurality of communication nodes transmits the vehicle communique;

wherein the vehicle communique include at least one of a cargo load, mission, and passing time and date parameters;

wherein the vehicle communication device of one of the plurality of vehicles is further configured to transmit vehicle communique to one of the plurality of communication nodes, such that the node memory of the one of the plurality of communication nodes stores the vehicle communique;

wherein the vehicle communication device of one of the plurality of vehicles transmits information that includes additional vehicle communique to the one of the plurality of communication nodes, such that the node memory of the one of the plurality of communication nodes updates the vehicle communique stored in response to the additional vehicle communique transmitted.

26. The transit system of claim 25 wherein the vehicle controller of each of the plurality of vehicles is further configured to cause each of the plurality of vehicles to perform specific actions based on the vehicle communique transmitted.

* * * * *